United States Patent [19]

Fletcher et al.

[11] 3,924,068

[45] Dec. 2, 1975

[54] LOW DISTORTION RECEIVER FOR BI-LEVEL BASEBAND PCM WAVEFORMS

[76] Inventors: James C. Fletcher, Administrator of the National Aeronautics and Space Administration, with respect to an invention of George E. Proch, Houston, Tex.

[22] Filed: Apr. 26, 1974

[21] Appl. No.: 464,720

Related U.S. Application Data

[63] Continuation-in-part of Ser. No. 428,994, Dec. 27, 1973.

[52] U.S. Cl. .................. 178/88; 178/69 C; 325/321

[51] Int. Cl.$^2$ .......................................... H04L 13/18

[58] Field of Search ......... 178/68 J, 69 R, 69 C, 88; 325/321; 307/231, 235, 236; 329/104; 328/119, 140

[56] References Cited

UNITED STATES PATENTS

| | | | |
|---|---|---|---|
| 3,244,986 | 4/1966 | Rumble | 328/140 |
| 3,343,091 | 9/1967 | Braglemans | 178/88 X |
| 3,461,390 | 8/1969 | Mack | 328/119 |

*Primary Examiner*—Benedict V. Safourek
*Attorney, Agent, or Firm*—Marvin J. Marnock; John R. Manning; Marvin F. Matthews

[57] ABSTRACT

Disclosed is an improved low distortion asynchronous receiver designed to receive balanced, differential signals from a transmission line, recover and reconstruct a positive logic level signal from the received signals and supply a suitable unipolar pulse code modulated (pcm) output waveform to a conventional sync detector/data decoder for further processing. A hybrid transformer couples the differential signals appearing on the transmission line into the receiver as a double-ended input referenced to the receiver ground. The double-ended signals are comprised of two signals of equal amplitude and opposite polarity. Each of the two signals is applied to a separate low-pass filter network to provide a standard waveform transition characteristic. Each filtered signal is supplied to a threshold detection circuit comprising a differential comparator, a NAND gate and a voltage divider network. The detection circuit provides a stable threshold level for converting the filtered line signal to positive logic levels. A hysteresis characteristic of the detector circuit prevents undesired output transitions when the filtered signal amplitudes are near the threshold level. Output circuitry provides waveform shaping in the output signals from the detection circuit to remove systematic waveform distortion. Included with the output circuitry is a rest and initialization circuit for ensuring a proper output level.

11 Claims, 7 Drawing Figures

LOW DISTORTION RECEIVER FOR BI-LEVEL BASEBAND PCM WAVEFORMS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

CROSS REFERENCE TO RELATED APPLICATION

This application is a continuation-in-part of U.S. Patent application Ser. No. 428,994 filed Dec. 27, 1973, entitled DIGITAL TRANSMITTER FOR DATA BUS COMMUNICATION SYSTEM and assigned to the assignee hereof.

BACKGROUND OF THE INVENTION

1. Field of the Invention

Generally, the present invention relates to communications systems. More specifically the present invention relates to an improved digital receiver that utilizes band limiting prefilters and a high amplitude threshold level to produce a low distortion, asynchronously restored unipolar pcm output signal from a balanced, differential input signal. The receiver is particularly suited for use in the NASA Triplex Flight Control System. In a specific application in this system, the receiver is to be used with a Redundant Flight Control data bus, which is routed throughout the Orbiter vehicle employed in the NASA Space Shuttle Program to provide multiplexed "party line" communication between various electronic packages remotely located on board the vehicle.

2. Brief Description of the Prior Art

A primary function of any receiver connected into a transmission line is to recover information from transmitted waveforms while discriminating against spurious signals that may occur on the line. The spurious signals can be distinguished from signalling waveforms by their energy (amplitude as a function of time) and their spectral composition (amplitude as a function of frequency). Typically, the lack of a suitable time reference allows the receiver "front end" to discriminate only on the spectral content to recover the signalling waveforms. These waveforms can then be processed to obtain an appropriate time reference with which the waveforms are decoded.

Where digitized information is to be transmitted over a transmission line to a remote receiver, the line is active over periods when data is being transmitted and is otherwise idle. When the line is idle, the receiver should have a high amplitude threshold to discriminate against spurious signals. When the line is active, these thresholds cause waveform distortion unless special measures are incorporated in the receiver.

Common receiver designs consist of a high gain, saturating differential amplifier with level shifting circuits to convert transmission line signals to standard logic levels. These receivers include auxiliary circuits for detection of and discrimination between information signals and spurious signals.

The high gain receiver output is equally responsive to information signals and spurious signals which increases the difficulties encountered in extracting encoded information and the likelihood of data errors. Modification of the gain characteristic with a biased amplifier and/or amplitude threshold circuitry inherently causes systematic waveform distortion that is dependent upon variations of bias, threshold level, signal amplitude and component tolerances. Such distortion decreases the stability of a clock signal extracted from the information signal and causes shifting of the output with subsequent sampling being less tolerant to timing instabilities.

An objective common to most prior art digital communication systems is to transmit the maximum number of data bits as accurately and quickly as possible with a minimum of components in the circuit. The frequency bandwidth of a communications system determines the maximum data transmission rate. The prior art has disclosed a variety of receivers designed to receive and reconstruct a signal transmitted at high bit rates.

One method for higher transmitting rates requires coding the data in a number system with a base greater than two. Many communication systems, therefore, use a quaternary base rather than a binary base in order to increase the transmission rate. While there is an increase in transmission rate in such systems, there are a number of disadvantages inherent in a quaternary system. First, quaternary systems are more sensitive to noise which causes a larger number of errors with a given noise level. Quaternary systems are also generally more complex. A typical quaternary system requires approximately twice the number of components as a binary system since the quaternary system must provide special conversion equipment to recover the binary information from the transmitted signals.

In U.S. Pat. No. 2,700,155 to Clayden, a system is proposed wherein bi-phase square wave signals are translated into conventional on-off signals by deriving short gating pulses from the received waveforms and applying these pulses, with the square wave signals, to a gate during the first half of each waveform period. If the signal voltage is positive at the time the gating pulse is supplied to the gate, the gate output is a high level, while if a negative or zero signal voltage is present, the gate output is low. This method requires that a plurality of synchronizing waveforms precede each message which in turn increases the complexity of the receiver design.

A second technique for detection of bi-phase signals is disclosed in U.S. Pat. No. 3,008,124 to Warnock. The receiver signals are delayed by one-half waveform period, then either the delayed or the received waveforms are inverted and the two resultant waveforms are added together. In this prior art system, it is necessary to transmit a synchronizing signal prior to the transmission of information in order to synchronize the receiver with the transmitter. Synchronous transmission requires a clock source at the receiver to provide gating pulses which gate the resultant waveform through respective positive and negative slicers. This system requires stable circuitry because the receiver must be properly initialized with the transmitter to have accurate reconstruction of data. Extensive circuitry is required in such systems, including delay, inverting and summing circuits. Since the circuitry is dependent on the phase of the signal, shifts in phase due to component variation, or otherwise, will produce undesired results.

Another system for detecting bi-phase signals is disclosed in U.S. Pat. No. 3,244,986 to Rumble. Rumble proposes a receiver having delay circuitry, inverters, a linear adder as well as threshold detectors and output degating circuitry. Since no clock is employed in this system, it is preferable that the received waveforms include a predetermined digit as its first transmission whenever any information is being transmitted. Again, extensive amounts of circuitry are employed to recover and reconstruct binary data from the transmitted information signal in this system.

In U.S. Pat. No. 3,388,330 to Kretzmer, a system is disclosed that interprets the received signals on more than two levels, as in many of the previously mentioned systems, and also on the basis of partial, rather than complete, channel response. In this system, response to a single symbol (bit of information) extends over more than one symbol interval. Therefore, each received signal sample includes contributions in a known pattern from several input symbols and may occupy one of several levels. The system requires circuitry for storing partial symbol responses, shift registers, a plurality of slicers, one for each level of response, and an adder circuit for supplying a reference voltage to a comparator.

While many of the receiver systems disclosed by the prior art are capable of receiving data at high bit rates, they also are quite complex and require extensive amounts of electronic circuitry for decoding the transmitted signal.

SUMMARY OF THE INVENTION

The present invention provides an improved low distortion digital receiver which, in one embodiment, is primarily designed to receive Manchester coded data at rates of 1.0 mega bits per second (MBPS) and provide a unipolar pcm output of suitable amplitude and quality to be processed by conventional sync detector/data decoder systems. The receiver's output interfaces with a sync detector/decoder section which performs a digital integration of the received waveforms to detect the sync signal, to establish a suitable timing reference, and to decode the serial data stream. For these purposes, the front end continuously monitors the line output waveforms with a minimum distortion of level transitions. The level transitions are important since the sync, binary data, and clock are all phase encoded.

The receiver of the present invention is broken into five stages which include: (1) line isolation circuitry employed to provide d.c. isolation between the line and the receiver, reject common mode voltages induced onto the line, and provide two signals of equal amplitude and opposite polarity so that positive and negative waveform transitions may be symmetrically processed; (2) a band-limiting pre-filter network including two identical low-pass filters which limit the high frequency response of the communication channel in order to provide a standard waveform transition characteristic; (3) a high amplitude threshold level circuit, comprising a positive threshold detector and a negative threshold detector, for detecting and converting the filtered signals of sufficient amplitude to standard logic levels; (4) a receiver output circuit which removes a delay inherent with the threshold circuit and converts the standard logic level outputs of the threshold detectors to a single unipolar pcm signal which is supplied to a sync detector/data decoder for further processing; and (5) a receiver initialization and reset circuit which ensures the proper receiver output. The reset circuitry is capable of generating an internal pulse or accepting an external pulse which allows initialization of the receiver both after electrical power is applied following large power supply or transmission line transients and at the end of a message when the transmission line is idle.

The receiver design combines the advantages of a band-limiting pre-filter and high amplitude thresholds to provide asynchronous discrimination between information signals and spurious signals in a manner that minimizes systematic distortion by cancellation of those factors which cause it. The threshold circuit converts filtered signals to standard logic levels and has a "hysteresis characteristic" for stable performance at threshold level signal amplitudes. The design also attenuates baseline wander of the received signal, features an automatic reset capability, and consists of stable digital circuits.

A hybrid transformer is employed for supplying each filter network with transmission line signals of equal amplitude, one in-phase and the other 180° out-of-phase with the transmission line signal. By this means, the threshold detectors symmetrically process the positive waveform transitions of the filtered signals which, in effect, means processing the positive and negative portions of the transmission line signal.

The receiver design causes an absolute delay of the entire waveform sequence as a function of the ratio of signal amplitude to threshold level. Since absolute delays are of little consequence for asynchronous communications, signal to threshold ratios as low as two can be used to achieve much greater amplitude discrimination against spurious line signals while maintaining substantially lower output distortion levels than can be obtained with other receiver designs.

The receiver developed for this application provides a continuous amplitude threshold in the signal path, but eliminates waveform distortion with a novel combination of simple and stable circuits. To these ends, the receiver provides; a high input impedance relative to the transmission line impedance; band-limited frequency response; digital circuits that do not require threshold adjustments or controls; low distortion of waveform transitions; and a single receiver output that is low when the line is idle, and otherwise corresponds to the differential line signals.

Other features, objects and advantages of the invention will become more readily apparent from the accompanying drawings, specification and claims.

DESCRIPTION OF THE ILLUSTRATED EMBODIMENT

Figure 1:
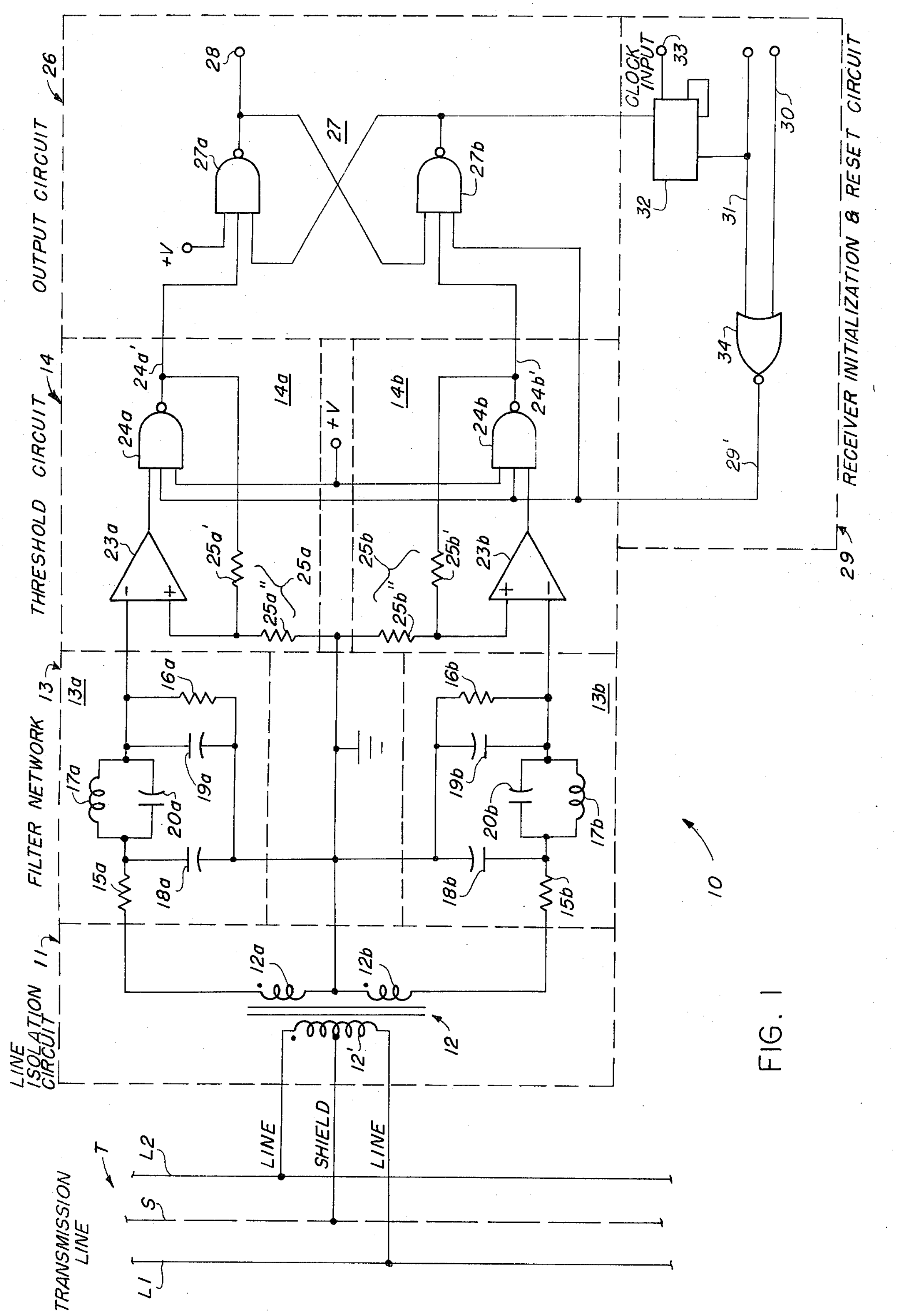
FIG. 1 schematically illustrates the digital receiver of the present invention.

Referring to FIG. 1 of the drawings, the digital receiver of the present invention is indicated generally at 10. The receiver 10 includes an isolation circuit 11 comprising a hybrid transformer 12 having a center-tapped primary winding 12' and secondary windings **12*a* and 12*b*. The receiver 10 asynchronously recovers and reconstructs digital information from balanced, differential line signals transmitted over a suitable transmission line T comprising conductors L1 and L2, and a shield S. The transmission line T is a single, twisted pair shielded line or other suitable line. The primary winding 12'** is connected to the lines L1 and L2 and the center-tap is connected to the shield S.

The transmission line signals appearing across lines L1 and L2 are coupled into the receiver 10 by the transformer 12 which provides d.c. isolation between the line T and the receiver 10. The illustrated arrangement also provides rejection of common mode voltages induced onto the line.

The differential line signals are coupled into the receiver 10 as a double ended input referenced to the receiver ground. The signals reflected in the secondary windings 12*a* and 12*b* are equal in amplitude to the line signals. The signals in secondary 12*a* are of the same polarity as the line signals, and the signals in secondary 12*b* are inverted.

The receiver 10 is provided with symmetrical circuitry for similar processing of each of the two signals provided simultaneously by the secondary windings 12*a* and 12*b*. Corresponding components in each half of the receiver 10 are identified by the same reference character with those in one half having the affix *a* and those in the other half having the affix *b*. Unless otherwise noted, corresponding components perform similarly.

The two signals appearing in the windings 12*a* and 12*b* are applied to a filter network 13 comprising two identical pre-filters 13*a* and 13*b*. The signals passed by the network 13 are sent to a threshold detection circuit 14 comprising two amplitude threshold circuits 14*a* and 14*b*. The circuits 13 and 14 function to symmetrically process positive and negative going transitions of the transmission line signals. As will be more fully described hereinafter, the circuit symmetry is configured to minimize systematic waveform distortion by cancellation of the factors which cause such distortion.

Examining one-half of the circuit 10, the signals in the secondary winding 12*a* are applied to the low pass filter 13*a* which band-limits the receiver response and provides a nominal load reflected onto the line. Resistors 15*a* and 16*a* are source and termination matching impedances for the filter 13*a*. In the absence of power supply voltages, the resistors 15*a* and 15*b* provide a minimum load reflected across the transmission line to prevent excessive mismatches in party line type of communications using multi-terminal systems. The filter 13*a* is designed to limit the high frequency response of the communication channel in order to provide a standard waveform transition characteristic to the amplitude threshold circuit 14*a* The filter 13*a* is preferably a four-element elliptic type comprising an inductor 17*a*, and capacitors 18*a*, 19*a* and 20*a*, connected as illustrated in FIG. 1. The necessary filter characteristics can also be realized with other RC, LC or RLC types of low-pass filter networks having a suitable cutoff frequency. In the illustrated embodiment, the cutoff frequency is preferably approximately 0.6 to 0.8 times the inverse of the minimum information waveform pulse width. In the circuit 10, the input impedance is also independent of unit power since a passive LC filter has been employed.

The filter response is the dominant influence on the received waveforms and will obscure variations in transmitted rise times as well as variations in line characteristics. The voltage transient at the filter output is a function of peak-to-peak amplitude changes and the filter response and is independent of the polarity. Consequently, the delay in detecting the positive level is ideally identical to the delay in detecting the negative level. Delay differences will occur in practice due to filter response variations and non-equal positive and negative threshold levels. Expected variations in an actual embodiment using currently available components amount to only two nanoseconds which is small compared to a basis 500 nanosecond half-bit period. Since the leading and trailing edge detections are delayed an equal amount, and the output circuitry changes states only with a level detection, the receiver output waveforms preserve the relative transition times of the line signal as will be more fully explained hereinafter.

The filtered signals are applied to the amplitude threshold circuit 14a which comprises a differential comparator 23*a* having a positive input (+) and a negative input (−), a NAND gate 24*a*, and a voltage divider network, indicated generally at 25*a*, employing resistors 25*a'* and 25*a''*. These components of the circuit 14*a* provide a Schmitt-type trigger circuit for conversion of filtered signals with sufficient amplitudes to standard logic levels at 24*a'*. Accordingly, the threshold circuit 14*a* provides a stable threshold level on the output line 24*a'* for conversion of filtered line signals to positive logic levels. The hysteresis characteristic of the threshold circuit 14*a* prevents undesired output transitions when the signal amplitudes are near the threshold level in a manner to be more fully explained. The threshold level is determined by the high level at the NAND output 24*a'* and the divider network 25*a*. In the illustrated embodiment, the values of resistors 25*a''* and 25*a''* have been selected to establish a trigger threshold of +0.24 volts which is equivalent to 0.96 volts differential from L1 to L2.

Initially, the outputs of NAND gates 24*a* and 24*b* provide a high logic level signal that is fed back through the resistive divider networks 25*a* and 25*b*. The attenuated logic levels at the positive input of the comparators 23*a* and 23*b* establish the threshold level that remains stable for power supply variations over the range in which standard logic circuits operate. When the filtered signal amplitude at the negative input becomes more positive than the threshold level at the positive input of the comparator 23*a*, the output of the comparator is driven high, causing the NAND gate 24*a* to switch to a low logic level output. The low logic level at the output 24*a'* is also fed back to the positive input of the comparator 23*a* and decreases the threshold level to a few millivolts above the ground level of the receiver 10. The resulting hysteresis characteristic provides a stable and definite threshold detection for signal amplitudes comparable to the initial threshold level. Although the detection circuits 14*a* and 14*b* are identical, one functions as a positive level detector and the other as a negative level detector when employed in the described manner with the phase-splitting hybrid transformer 12.

The outputs of the gates 24*a* and 24*b* are supplied to a receiver output circuit 26, comprising an RS-latch 27 employing NAND gates 27*a* and 27*b*. The receiver output is provided at 28 to be supplied to a conventional sync detector/data decoder (not illustrated). The receiver output 28 must be initialized to ensure the proper output level. To this end, a receiver initialization and reset circuit 29 is employed. The required initial conditions are established by driving the NAND gate output lines 24*a'* and 24*b'* high to set the high threshold level at the positive input of the comparators 23*a* and 23*b*, and to set the receiver output at 28 to a low logic level. The required conditions are established by simultaneously resetting the positive and negative threshold detectors 23*a* and 23*b* and forcing the RS-latch 27 to output a low level at 28. This is achieved by applying a low level pulse on line 29' which is supplied to the inputs of NAND gates 24*a*, 24*b* and 27*b*.

Provision is made to either generate an internal reset pulse or accept an external reset pulse generated elsewhere. The external pulse is supplied over the line 30. The internal pulse is generated on line 31 whenever the receiver output at 28 remains at a high level for a selected nominal period of time. The period is established by enabling a four-bit, resettable counter 32 to accumulate a selected number of clock pulses supplied at a clock input 33. The clock pulses are asynchronous with line signals. The counter 32 resets itself to zero when the receiver outputs a low level at 28.

The described capability of the circuit 10 to either generate an internal pulse or accept an externally generated pulse is provided by the combined operation of the resettable counter 32 with a NOR gate 34. The counter 32 is cleared when the receiver output 28 is low and accumulates external timing pulses when the output 28 is high, the assumed improper state. If the signal at the output 28 remains high for a predetermined time period equivalent to the selected number of accumulated clock pulses, the counter output on line 31 goes high driving the output of gate 34 low to establish the stated conditions. When the receiver output 28 is forced low, it clears the counter 32 which drives line 29' to its normal high level. An external initialization signal may be applied to the NOR gate 34 over the line 30 for similar action. The provision of an internal pulse permits initialization of the receiver 10 immediately after electrical power is applied to the circuits, or in the event of large power supply or transmission line transients amplitudes and also at the end of a message when the transmission line is idle.

Figure 2:
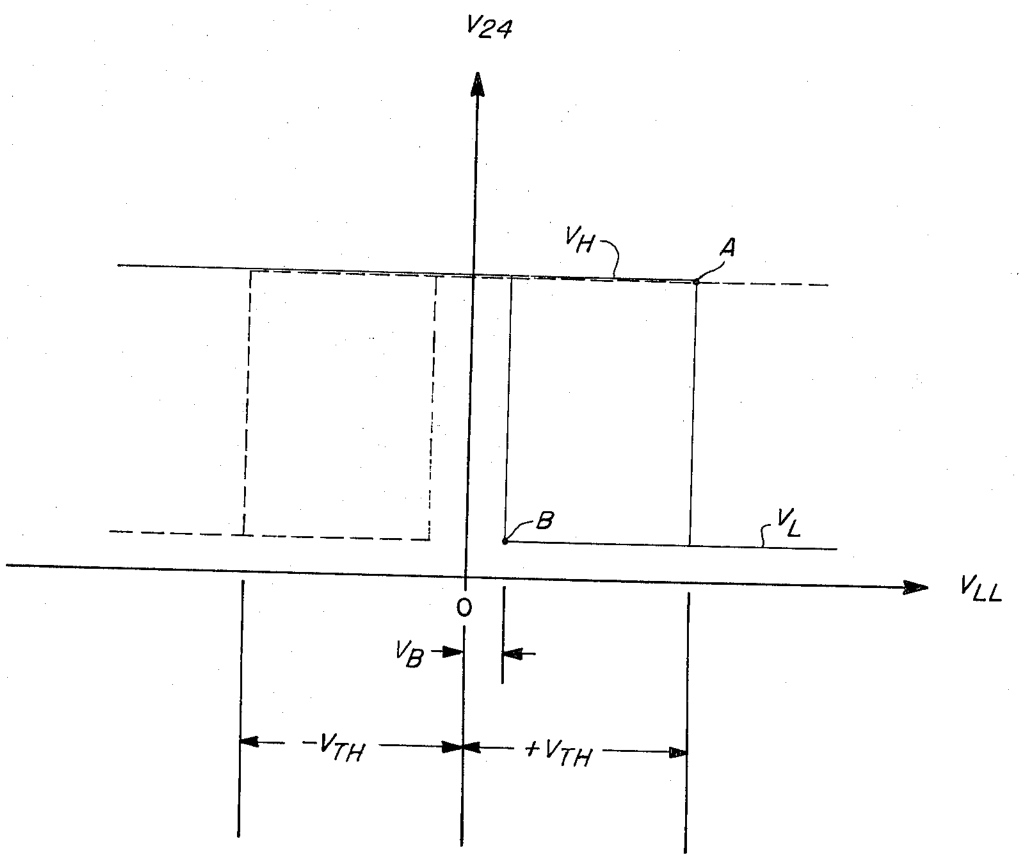
FIG. 2 illustrates the receiver amplitude characteristic as a function of transmission line signal amplitude.

The hysteresis curve of FIG. 2 graphically depicts the output $V_{24}$ of the circuit 14 relative to the line signal $V_{LL}$. The solid line portion of the graph in FIG. 2 represents the output of the gate 24*a* and the dotted line portion represents the output of the gate 24*b*. While only the output of the gate 24*a* is described in the following description, it will be appreciated that the output of the gate 24*b* is symmetrical about the vertical axis with the output from the gate 24*a*. In some places, the dotted line has been shown adjacent to, but spaced from, the solid line for purposes of illustration, however, it will be appreciated that at these places, the two lines should be coincident rather than adjacent.

So long as the line-to-line voltage $V_{LL}$ is negative or does not become more positive than the value $+V_{TH}$ (the upper threshold voltage) indicated at point A, the output of gate 24*a* remains at the high logic level $V_H$. When $V_{LL}$ exceeds $+V_{TH}$, the output of gate 24*a*drops to the low logic level $V_L$. So long as the line voltage $V_{LL}$ does not decrease below the voltage $V_B$ (the lower threshold voltage level) indicated at the point B, the output of the gate 24*a* remains at the low logic level $V_L$.When $V_{LL}$ drops below $V_B$, the output of the gate 24*a* returns to the high logic level $V_H$ where it remains until the line voltage $V_{LL}$ again exceeds $+V_{TH}$.

From the foregoing, it may be appreciated that the response of the circuit 14 to a particular input signal as represented by FIG. 2 depends not only on the instantaneous values, but also on the immediate past or recent history of the input and output signal. This feature allows the receiver to discriminate against spurious signals appearing on the line, at or near the threshold voltage.

In the absence of this hysteresis characteristic, if noise oscillations occurred so that the signal input to the circuit 14 alternately exceeded and then fell below the threshold level of the comparators 23, the output of the comparators, and therefore the gates 24 would also change their output levels with each crossing of the threshold level by the input signal to the circuit 14 producing an incorrect receiver output.

FIGS. 3–7 illustrate various exemplary waveforms present at different points in the receiver 10 under hypothetical operating conditions. The waveforms of FIGS. 3–7 are vertically aligned to permit observation of the time relationships between the occurrence of the changes in the levels of the line signal, the filtered signal, the signals appearing at the outputs of the threshold detectors and the unipolar pcm output of the receiver 10. The place of appearance of the waveforms within the circuit of FIG. 1 are designated in FIGS. 3–7.

Figures 3, 4, 5, 6, 7:
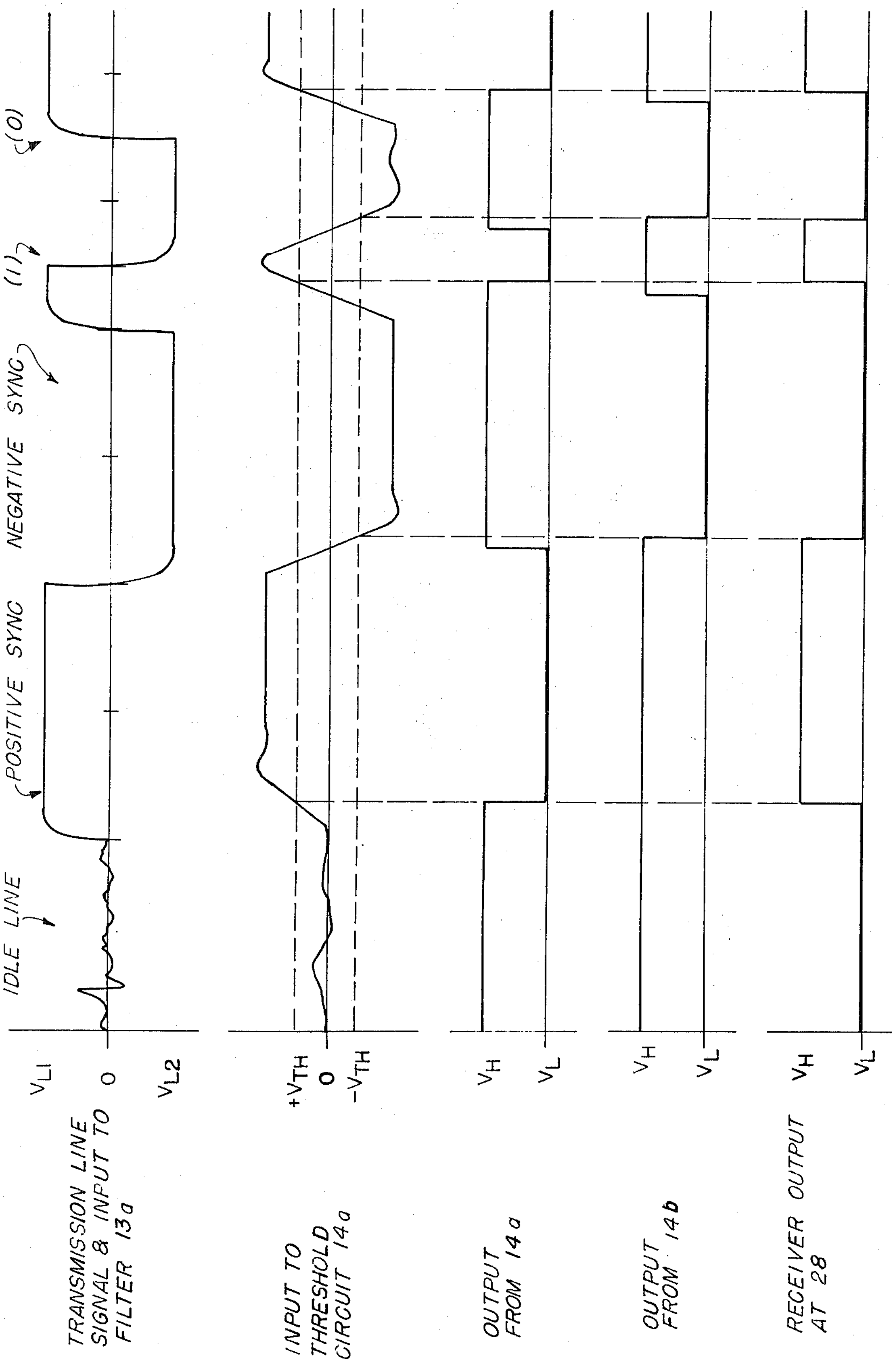
FIGS. 3–7 illustrate exemplary waveforms appearing at various points in the circuitry of the receiver.

FIG. 3 illustrates an exemplary Manchester coded signal. While the receiver was designed primarily for a system employing Manchester coded data, it is not necessarily so limited since it is capable of recovering encoded information from any of a variety of zero d.c. signals. The exemplary transmission line signal of FIG. 3 may be generated by any suitable transmitter of Manchester coded data. FIG. 3 illustrates the line-to-line signal, which is a balanced, differential signal coupled into the receiver 10 by the transformer 12. The waveform of FIG. 3 is also representative of waveforms applied to the input of the low pass filter 13*a*. Because of the transformer action, the waveform (not illustrated) applied to the low pass filter 13*b* is the inverted form (180° out-of-phase) of FIG. 3. By providing an in-phase signal and a 180° out-of-phase signal, it is possible to symmetrically process the positive and negative transistions of the transmission line signal, thus minimizing distortion due to spurious signals.

Since the transient responses of the low-pass filters 13*a* and 13*b* dominate signal transitions, the transient time delay required to cross the positive threshold $+V_{TH}$ is nominally equal to the delay required to cross the negative threshold $-V_{TH}$ (FIG. 4). By inputting the outputs of NAND gates 24*a* and 24b into the latch circuit 27, the receiver output at 28 changes states only when lines 24*a'* or 24*b'* switches from a logic high to a logic low which correspond to a positive or negative threshold crossing. Thus, the systematic waveform distortion at the receiver output 28 is nominally zero since detection of the rising and falling edges of the input waveform sequence is delayed equal amounts. In practice, a finite distortion level will exist due to circuit differences. The receiver design causes an absolute delay of the entire waveform sequence as a function of the ratio of signal amplitude to threshold level. Since absolute delays are of little consequence for asynchronous communications, signal-to-threshold ratios as low as two can be used to achieve much greater amplitude discrimination against spurious line signals while maintaining substantially lower output distortion levels than can be obtained with other receiver designs.

In describing the operation of the output circuit 26, it is initially assumed that the outputs from the positive and negative detectors 14*a* and 14*b*, respectively, are at a high logic level (FIGS. 5 and 6) and the receiver output at 28 is low (FIG. 7). The receiver output 28 remains low until the filter output (FIG. 4) supplied to the negative input of comparator 23*a* equals or exceeds the positive threshold level $+V_{TH}$. When this occurs, the output 28 goes high (FIG. 7) and remains high until the negative detector threshold ($-V_{TH}$) is exceeded. This duration restoring characteristic is obtained from the RS-latch 27 driven by the detector outputs, lines **24*a*' and 24*b*'. As indicated previously, the latch 27 changes states only when a negative transistion occurs at either detector output 24*a*' or 24*b*'**. Except for component failure, it is impossible for both detector outputs to be low simultaneously. No change in state occurs when the detector outputs are high.

The initial output pulse (positive sync waveform) is distorted as shown in FIGS. 3 and 4. The leading edge is distorted since the peak-to-peak input is one-half of that which occurs within the serial stream. In the system of the present invention, the transition from positive sync to negative sync is undistorted and is used as an internal timing reference. The leading edge of the positive sync is not used for this purpose because of its amplitude sensitivity.

The waveform of FIG. 7 illustrates the unipolar pcm output at 28, which may be supplied to a sync detector/data decoder (not illustrated) for processing. It should be noted that the waveform of FIG. 7 is a standard logic level signal having pulses of the same duration as the positive transitions of FIG. 3. Therefore, the waveform of FIG. 7 is an asynchronously restored pcm waveform which is identical to the original information signal supplied to the transmitter.

The electrical components identified in the following listing were employed in the construction of an embodiment of the receiver 10.

| RESISTORS | | |
|---|---|---|
| Reference Character | Rating in Ohms | |
| 15a, 15b, 16a, 16b, 25a', 25b' | 3.0 K | |
| 25a'', 25b'' | 220 | |
| **CAPACITORS** | | |
| Reference Character | Rating in Picofarads | |
| 18a, 18b, 19a, 19b, | 56.0 | |
| 20a, 20b | 10.0 | |
| **INDUCTORS** | | |
| Reference Character | Rating in Microhenries | |
| 17a, 17b | 270.0 | |
| **INTEGRATED CIRCUITS** | | |
| Reference Character | Manufacturer | Specification |
| 23a, 23b, 24a, 24b | Texas Instruments | SN75107 |
| 27a, 27b | Texas Instruments | SN7410 |
| 34 | Texas Instruments | SN7402 |
| 32 | Texas Instruments | SN7493 |
| **TRANSFORMER** | | |
| Reference Character | Manufacturer | Specification |
| 12 | Vari-L Co. Inc. | Model SH 70 Hybrid Pulse Transformer |
| **POWER SUPPLIES** | | |
| +V = 5.0 volts | | |
| −V = −5.0 volts | | |

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A receiver for a zero direct current input signal transmitted as the output signal from a remotely located transmitter comprising:

a. duplicating and inverting means for providing an inverted signal which has the same amplitude as that of the receiver input signal but is 180° out-of-phase with said receiver input signal;

b. processing means in said receiver for processing said receiver input signal and said inverted signal for symmetrically processing positive and negative going transitions of said receiver input signal;

c. filter means including frequency responsive circuit means in said processing means fr symmetrically filtering and band limiting said receiver input and said inverted signal;

d. threshold detector means for providing first and second detector signals wherein said first detector signal is representative of the occurrence of one or more signal parameters in said filtered receiver input signal and in said filtered inverted signal which reach predetermined values and wherein said second detector signal is representative of the absence of the occurrence thereof;

e. hysteresis means included with said threshold detector means for causing said threshold detector means to maintain said first detector or said second detector output once formed until the one or more parameters of said filtered receiver input signal and said filtered inverted signal reach predetermined values which are different from those causing the formation of said detector signals;

f. output circuit means selectively responsive to at least one of said first and second detector signals for reproducing an undistorted signal directly corresponding to the input signal supplied to said transmitter, said output circuit means including pulse duration restoring means for providing pulse durations in one or more of said first and second detector signals corresponding to those durations of the pulses in said receiver input signal and said inverted signal which produced said detector signals, said pulse duration restoring means including latch means responsive to the transition from said second to said first detector signal to produce said undistorted signal.

2. A receiver as defined in claim 1 wherein said duplicating and inverting means includes a transformer.

3. A receiver as defined in claim 2 wherein:

a. said remotely located transmitter is coupled with a transmission line; and b. said transformer is coupled through its primary winding with said transmission line and includes two secondary windings, one of said secondary windings reproducing the signal on said transmission line to provide said receiver input signal and the other secondary winding forming a signal which has the same amplitude as that of the line signal but is 180° out-of-phase to provide said inverted signal.

4. A receiver as defined in claim 1 wherein:

a. said threshold detector means includes amplitude responsive means for providing said first detector signal when the amplitudes of said filtered receiver input signal and said inverted signal are more positive than a predetermined positive threshold value; and b. said hysteresis means includes means for causing the formation of said second detector signal when the amplitudes of said filtered receiver input signal and said inverted signal become less positive than a predetermined positive value which is less positive than that of said positive threshold value.

5. A receiver as defined in claim 1 further including receiver initialization and reset means responsive to the occurrence of predetermined power supply or data conditions for imposing predetermined initial conditions upon said receiver to prepare said receiver to receive data following the occurrence of said predetermined power supply or data conditions.

6. A receiver as defined in claim 5 wherein said initialization and reset means includes a reset means comprising a resettable pulse counter connected with a pulse producing clock means, said counter including means for forming an internally generated reset pulse which is supplied to reset gate means when a predetermined number of pulses have been generated by said clock means, said threshold detector means being responsive to said internal reset pulse for causing said threshold detector means to form a selected one of said first or second detector signals.

7. A receiver as defined in claim 6 wherein said reset pulse causes said threshold detector means to form said second detector signal.

8. A receiver as defined in claim 5 wherein one or more said predetermined data conditions includes a synchronization signal comprising a positive and negative sync pulse with said predetermined initial condition occurring on the transition from said positive sync pulse to said negative sync pulse.

9. A receiver as defined in claim 6 wherein said receiver initialization and reset circuit means further includes means for accepting an externally generated reset pulse and said threshold detector means is responsive to said internal or said external reset pulse for causing said detector means to form a selected one of said first or second detector signals.

10. A receiver as defined in claim 9 wherein said reset gate means accepts said internal reset or said external reset pulse for imposing said predetermined initial conditions upon said receiver.

11. A receiver as defined in claim 10 wherein said threshold detector means further includes:

a. first and second differential comparator means each having positive and negative inputs with said filtered receiver input signal supplied to the negative input of said first differential comparator means and said filtered inverted signal each supplied to the negative input of said second comparator means;

b. first and second gate circuit means responsive to the output of said reset gate and to the output of said comparator means for producing said first and second detector signals; and c. feedback means responsive to said detector signals and applied to said positive inputs of said comparators for determining said threshold values at which said first and second detection signals are formed.

* * * * *